United States Patent [19]

Takemoto

[11] Patent Number: 5,341,170
[45] Date of Patent: Aug. 23, 1994

[54] AUTO FOCUSING DEVICE

[75] Inventor: Hiroshi Takemoto, Yokohama, Japan

[73] Assignee: Ricoh Company, Ltd., Tokyo, Japan

[21] Appl. No.: 24,856

[22] Filed: Feb. 26, 1993

Related U.S. Application Data

[63] Continuation of Ser. No. 719,498, Jun. 24, 1991, abandoned.

[30] Foreign Application Priority Data

Oct. 18, 1990 [JP] Japan .................. 2-280315

[51] Int. Cl.$^5$ ............................. H04N 5/232
[52] U.S. Cl. ..................... 348/354; 348/349; 354/402
[58] Field of Search ............ 358/227, 209, 909; 354/402, 406, 407, 400; 250/201.7, 201.8; 382/56; 348/345, 348, 349, 354, 355, 356, 207, 220

[56] References Cited

U.S. PATENT DOCUMENTS

| | | | |
|---|---|---|---|
| 4,484,806 | 11/1984 | Onishi et al. | 354/404 |
| 4,872,058 | 10/1989 | Baba et al. | 358/209 |
| 4,967,279 | 10/1990 | Murashima | 358/227 |
| 4,990,947 | 2/1991 | Komiya et al. | 354/402 |
| 4,998,126 | 3/1991 | Kazami | 354/400 |

FOREIGN PATENT DOCUMENTS

| | | | |
|---|---|---|---|
| 62-146081 | 6/1987 | Japan | H04N 5/232 |
| 2140330 | 11/1984 | United Kingdom | G03G 15/06 |

OTHER PUBLICATIONS

IEEE Transactions of Communications, vol. COM-32, No. 3, Mar. 1984; "Scene Adaptive Coder".

Primary Examiner—Joseph Mancuso
Assistant Examiner—Tuan V. Ho
Attorney, Agent, or Firm—Oblon, Spivak, McClelland, Maier & Neudstadt

[57] ABSTRACT

An auto focusing device includes an image pickup device for photographing a subject and for outputting a video signal of the photographed subject, a digitizing device for digitizing the video signal from the image pickup device, an orthogonal transformation device for orthogonally transforming the digitized video signal to each frequency component so as to adjust a focusing point of the image pickup device on the basis of each of the frequency components, and a grouping device for arranging together the frequency components having a similar characteristic as one group to make a plurality of groups of focusing information data so that the focusing point of the image pickup device is adjusted on the basis of the focusing information data of the plurality of groups.

5 Claims, 4 Drawing Sheets

Fig. 3

HORIZONTAL FREQ. COMPONENT

| f(0,0) | f(0,1) | f(0,2) | f(0,3) | f(0,4) | | | f(0,7) |
|---|---|---|---|---|---|---|---|
| f(1,0) | f(1,1) | | | | | | f(1,7) |
| f(2,0) | | | | | | | |
| | | | | | | | |
| | | | | | | | |
| | | | | | | | |
| | | | | | | | |
| f(7,0) | | | | | | | f(7,7) |

VERTICAL FREQ. COMPONENT

| × | 1 | 2 | 3 | 4 | 5 | 6 | 7 |
|---|---|---|---|---|---|---|---|
| 1 | 2 | 3 | 4 | 5 | 6 | 7 | 8 |
| 2 | 3 | 4 | 5 | 6 | 7 |   | 9 |
| 3 | 4 | 5 | 6 | 7 |   |   |   |
| 4 | 5 | 6 | 7 |   |   |   |   |
| 5 | 6 | 7 |   |   |   |   | 12 |
| 6 | 7 |   |   |   |   | 12 | 13 |
| 7 | 8 |   |   |   | 12 | 13 | 14 |

Fig. 6

|   | i → |   |   |   |   |   |   |
|---|---|---|---|---|---|---|---|
| ✕ | G01 | G02 | G03 | G04 | G05 | G06 | G07 |
| G10 | G11 | G12 | G13 | G14 | G15 | G16 |   |
| G20 | G21 | G22 |   |   |   |   |   |
| G30 | G31 |   |   |   |   |   |   |
| G40 |   |   |   |   |   |   |   |
| G50 |   |   |   |   |   |   |   |
| G60 |   |   |   |   |   |   |   |
| G70 |   |   |   |   |   |   | G77 | j ↓

AUTO FOCUSING DEVICE

This application is a continuation of application Ser. No. 07/719,498, filed on Jun. 24, 1991, now abandoned.

BACKGROUND OF THE INVENTION

1. Field of the Invention

The present invention relates to an auto focusing device used in a publicly used compact photographing device.

2. Description of the Related Art

A triangular method for measuring distance or an infrared distance measurement method has been adopted for auto focusing in a compact photographing device such as a camera. Recently, various products have been developed in which a video signal output from image sensor means is directly used for focusing. This is called a mount climbing-like method for measuring distance. The principle of this method is that the high frequency component of the video signal output from the image sensor is maximized when the camera becomes in focus.

An example of the distance measurement method is described below.

A subject is photographed by an image pickup system which outputs a video signal. The signal is amplified by a preamplifier.

The video signal from the preamplifier is changed to three signals, i.e., a red signal R, a green signal G, and a blue signal B by a signal processing circuit. A display device displays the image of the subject in accordance with the R, G and B signals. A band pass filter (BPF) filters the video signal from the preamplifier to pick up the high frequency component from the signal. A calculation unit calculates an in focus information data which represents the focusing state of the image pickup system on the basis of the high frequency component signal output through the filter. After that, a motor control unit drives a motor in response to the in focus information data transmitted from the calculation unit to move the lenses of the image pickup system so that the system becomes in focus.

In accordance with the above-mentioned auto focusing device, depending on the subject, a false peak arises wherein the high frequency component of the video signal from the image pickup system is temporarily maximized at one timing though the system is not in the in focus state. When the false peak arises, the calculation unit outputs an in focus information signal so that the image pickup system is focused on the false peak.

To avoid this problem, for example, an in focus discrimination method is proposed wherein the calculation unit discriminates the in focus state in such a way that a plurality of band pass filter are used to simultaneously filters a plurality of frequency components of the video signal output from the image pickup system and the system is regarded as being in focus when all of the components are at their peak.

As mentioned above, in accordance with the auto focusing device mentioned above, the calculation unit outputs the in focus signal in response to the false peak, which results in that the image pickup system is wrongly focussed to the false peak.

Also, in accordance with the in focus discrimination method mentioned above, the problem is not sufficiently solved and other problems arise. That is, the number of the parts is increased since a plurality of BPFs are used. Also, each frequency component of the video signal from the image pickup system is detected by a fixed band pass filter which results in that the characteristic of the subject image is limited. That is, the desirable way of obtaining the in focus information signal can not be conducted, which way is to detect as many frequency components as possible and select a component according to the image of the subject since the characteristics of the video signal from the image pickup system, such as height of the peak and the sharpness thereof, are different according to the subject. If the desirable way is to be achieved, the number of the parts must be further increased as well as the cost of the device.

SUMMARY OF THE INVENTION

It is therefore an object of the present invention to provide an auto focusing device in which the above-mentioned problems can be attenuated and in which the focus point is adjusted on the basis of the in focus information data without being influenced by the subject image and without increasing the number of the parts so that the matching reliability of the in focus information data is increased.

The above-mentioned object of the present invention can be achieved by an auto focusing device comprising:

an image pickup system for photographing a subject and for outputting a video signal of the photographed subject;

a digitizing means for digitizing the video signal from the image pickup means;

an orthogonal transformation means for orthogonally transforming the digitized video signal to each frequency component so as to adjust a focusing point of the image pickup means on the basis of each of the frequency components; and a grouping means for arranging together the frequency components having a similar characteristic as one group to make a plurality of groups of focusing information data so that the focusing point of the image pickup means is adjusted on the basis of the focusing information data of the plurality of groups.

That is, in accordance with the auto focusing device of the present invention, the video signal transmitted from the image pickup system is digitized and converted to respective frequency components with the use of a quadrature converter (orthgonal transformation unit) so that the focal point of the image pickup system is adjusted on the basis of the frequency components. A grouping means groups the components having a similar characteristic to form a plurality of groups. The focal point of the image pickup system is adjusted on the basis of the in focus information data of the groups.

Therefore, it is an advantage of the present invention that the dependence of the focus adjustment on the subject image can be minimized.

Also, it is another advantage of the present invention that the number of parts can be reduced.

In accordance with an embodiment of the present invention, the auto focusing device comprises a calculation means for calculating an in focus information data of the group having the largest number of components which are in focus from the plurality of groups. The focal point of the image pickup system is adjusted on the basis of the in focus information data obtained by the calculation means.

It is therefore still another advantage of the present invention that it becomes possible to obtain a stable and accurate in focus information data for any subject image so that the reliability of auto focusing function can be raised.

Also, in accordance with still another embodiment of the present invention, the auto focusing device comprises a calculation means for combining the plurality of in focus information data of the respective groups to form an in focus information data which matches with the characteristic of the natural image.

Therefore, it is a further advantage of the present invention that it becomes possible to reduce the amount of information data without impairing the advantage that the dependence of the focus adjustment on the subject image is minimized. Accordingly, it becomes possible to reliably match the in focus information data with the function of the hardware for adjusting the focal point in response to the focus information data.

Further objects and advantages of the present invention will be apparent from the following description of the preferred embodiments of the invention as illustrated in the accompanying drawings.

BRIEF DESCRIPTION OF THE DRAWINGS

FIG. 3 is an explanatory view of the DCT (Discrete Cosine Transform) of the embodiment of FIG. 2;

FIG. 6 is an explanatory view for explaining the function of weighting the information data of the embodiment mentioned above.

DESCRIPTION OF THE PREFERRED EMBODIMENTS

Figure 1:
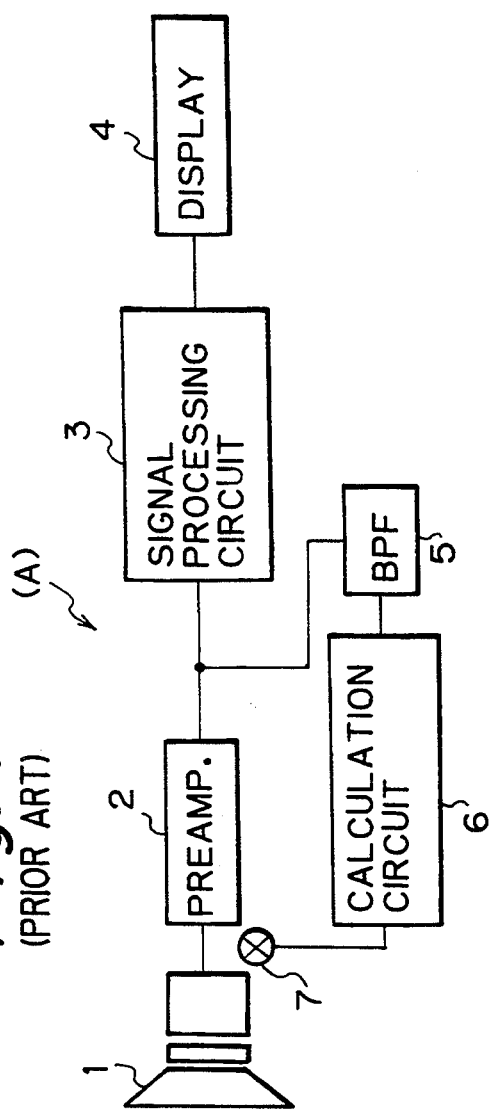
FIG. 1 is a block diagram of an example of the auto focusing device in accordance with the related art.

Embodiments of the present invention are described hereinafter in detail with reference to the drawings and in comparison to the related art which is also described referring to the drawings.

FIG. 1 illustrates an example of the auto focusing device (A) in accordance with the related art.

A subject is photographed by an image pickup system 1 which outputs a video signal. The signal is amplified by a preamplifier 2.

The video signal from the preamplifier 2 is changed to three signals, i.e., a red signal R, a green signal G, and a blue signal B by a signal processing circuit 3. A display device 4 displays the image of the subject in accordance with the R, G and B signals. A band pass filter (BPF) 5 filters the video signal from the preamplifier 2 to pick up the high frequency component from the signal. A calculation unit 6 calculates an in focus information data which represents the focusing state of the image pickup system 1 on the basis of the high frequency component signal output through the filter 5. After that, a motor control unit 7 drives a motor in response to the in focus information data transmitted from the calculation unit 6 to move the lenses of the image pickup system 1 so that the system 1 becomes in focus.

In accordance with the above-mentioned auto focusing device (A), depending on the subject, a false peak arises wherein the high frequency component of the video signal from the image pickup system 1 is temporarily maximized at one timing though the system 1 is not in the in focus state. When the false peak arises, the calculation unit 6 outputs an in focus information signal so that the image pickup system 1 is focused on the false peak.

To avoid this problem, for example, an in focus discrimination method is proposed wherein the calculation unit 6 discriminates the in focus state in such a way that a plurality of band pass filters 5 are used to simultaneously filter a plurality of frequency components of the video signal output from the image pickup system 1 and that the system 1 is regarded as being in focus when all of the components are at their peak.

As mentioned above, in accordance with the auto focusing device (A) mentioned above, the calculation unit 6 outputs the in focus signal in response to the false peak, which results in that the image pickup system 1 is wrongly focussed to the false peak.

Also, in accordance with the in focus discrimination method mentioned above, the problem is not sufficiently solved and other problems arise. That is, the number of the parts is increased since a plurality of BPFs are used. Also, each frequency component of the video signal from the image pickup system 1 is detected by a fixed band pass filter which results in that the characteristic of the subject image is limited. That is, the desirable way of obtaining the in focus information signal can not be conducted, which way is to detect as many frequency components as possible and select a component according to the image of the subject since the characteristics of the video signal from the image pickup system, such as height of the peak and the sharpness thereof, are different according to the subject. If the desirable way is to be achieved, the number of the parts must be further increased as well as the cost of the device.

The above-mentioned problems can be solved by the embodiment of the present invention described below.

Figure 2:
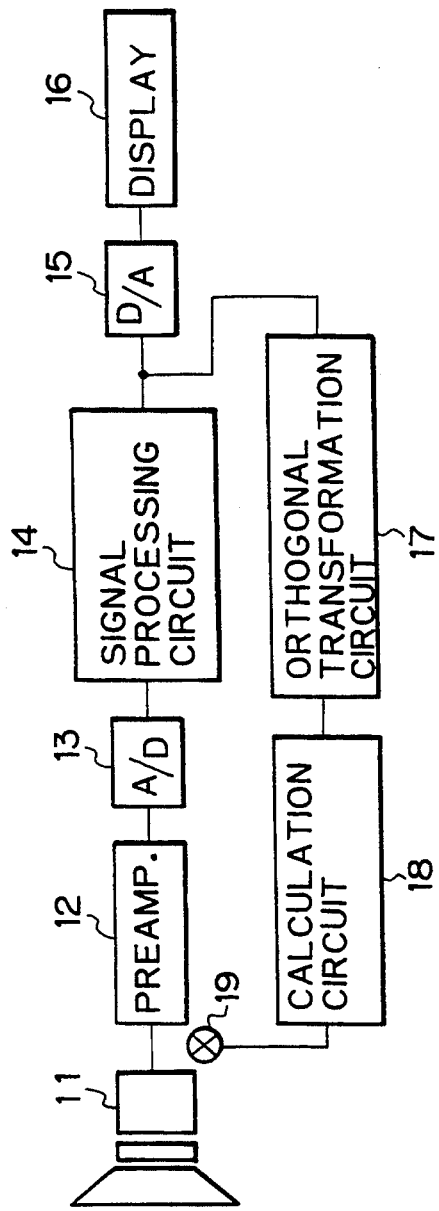
FIG. 2 is a block diagram of an embodiment of the auto focusing device in accordance with the present invention.

FIG. 2 illustrates an embodiment of the present invention.

A subject is photographed by an image pickup system 11 which outputs a video signal. The signal is amplified by a preamplifier 12 and then converted to a digital signal from the analog signal by an A/D converter 13. The digital video signal output from the A/D converter 13 is transmitted to a signal processing circuit 14 and then to a D/A converter 15 which converts the signal to an analog signal. A display device 16 displays the subject image in response to the signal output from the D/A converter 15. An orthogonal converter unit 17 conducts an orthogonal conversion of the video signal transmitted from the circuit 14, as described later. A calculation unit 18 calculates the in focus information data which represents the in focus state of the image pickup system 11, as described later.

After that, a motor control unit 19 drives a motor on the basis of the in focus information data transmitted from the calculation unit 18 so as to move the lenses of the image pickup system 11 to adjust the focal point of the system.

There are several ways to convert the video signal to a region of frequency such as Fourier transformation method, Cosine transformation method and Hadamard's transformation method. In this particular embodiment, the DCT (Discrete Cosine Transform) method is adopted which is supposed to be a standard method for encoding the video signal transmitted to the converter unit 17 from the circuit 14. By adopting the DCT arrangement, it becomes possible to use the DSP (Digital Signal Processor) specially for the DCT as it is.

The DCT is one of the orthogonal transformation methods now being proposed. When the unit 17 operates the two-dimensional DCT to the video signal from the circuit 14, all of the frequency components are included in the signal, as illustrated in FIG. 3. More precisely, on the condition that a pixel forming the video image is divided to a matrix of 8×8 pixel elements and the video signal is identified by f(i,j) wherein i=0 to 7 and j=0 to 7, when the two-dimensional DCT is conducted to the video signal, the signal F(u,v) after the DCT process is represented as follows.

$$F(u,v) = \frac{4C(u)C(v)}{N \times N} \sum_{i=0}^{N-1} \sum_{j=0}^{N-1} f(i,j) \times \cos\frac{(2i+1)u\pi}{2N} \times \cos\frac{(2j+1)v\pi}{2N}$$

wherein u=0 to 7 and v=0 to 7.

The signal F(u,v) is called a DCT coefficient and is represented by a matrix as illustrated in FIG. 3. In the above equation, $C(v)=1/\sqrt{2}$ (when W=0) or 1 (when W=1, 2, ... N−1).

The DCT coefficient F(u,v) corresponds to the transformation coefficients for frequency components of u/2N times and v/2N times of the highest frequency signal included in the video signal. Therefore, the DCT coefficient F(0,0) corresponds to the transformation coefficient of the direct current components of zero frequency included in the video signal.

In the matrix of FIG. 3, the DCT coefficient corresponds to the transformation coefficient of higher frequency as the DCT moves to the rightward or downward in the table. For example, the coefficients F(0,0) to F(0,7) in the uppermost line of the matrix is arranged in such a manner that the DCT coefficients corresponding to the transformation coefficients of the lowest frequency vertical signal components in the video signal are disposed in order of the horizontal component frequency so that the frequency becomes higher toward the right.

Also, the DCT coefficients F(0,0) to F(7,0) of the leftmost row of the matrix are arranged in such a manner that the coefficients of respective components corresponding to the transformation coefficients having the lowest horizontal components of the video signal are disposed in order of the vertical component frequency so that the frequency becomes higher toward the lower side of the row. For example, the coefficient F(7,7) corresponds to the transformation coefficient for the highest frequency component.

The DCT coefficient becomes larger as the focusing point approaches the subject to be focused. Therefore, by moving the lens of the system 11 so that the coefficient is maximized, the system 11 becomes in focus. In this case, it is troublesome to detect all of the DCT coefficients which, besides, are not necessarily maximized at the same point. This is because certain frequency components are prevailingly included in the video signal depending on the subject image.

Figures 4, 5:
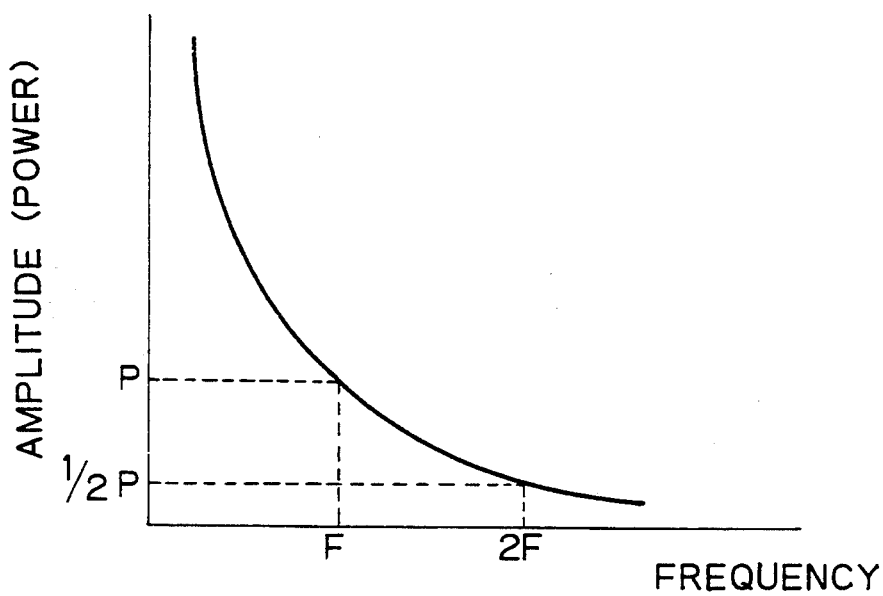
FIG. 4 is an explanatory view for explaining the function of grouping the DCTs of FIG. 3.
FIG. 5 is a graphical view for representing the relation between the power and frequency of the natural image.

To cope with this problem, the calculation unit 18 groups the DCT coefficients F(u,v) by the coefficients corresponding to the transformation coefficients of the components having different directions but almost the same frequency. That is, the DCT coefficients F(u,v) which satisfy the equation u+v=k (k:const.) as represented by the same number in FIG. 4 are arranged together as one group. An arithmetic mean of the DCT coefficients F(u,v) is calculated for each group as an in focus information data of the group. Then, a group is obtained which group has the most maximum DCT coefficients (in focus information data). Thereby, it becomes possible to remove the dependence of the focusing function on the video image and unnecessary to detect all of the DCT coefficients so that the in focus accuracy can be raised.

FIG. 5 illustrates the power which is possessed by each frequency component included in the special frequency of the natural image. As can be seen from the graph of FIG. 5, the power is in proportion to the reciprocal number of the frequency. On the other hand, each numeral represented in FIG. 4 is almost equal to the frequency of each image signal component. That is, the frequency of the DCT coefficient of each component included in the group 2 is twice that of each component included in the group 1. Also, the frequency of the DCT coefficient of each component included in the group 3 is almost three times as large as that of each component included in the group 1. The frequency of the DCT coefficient of each component included in the group 14 is fourteen times as large as that of each component included in the group 1.

Therefore, the calculation unit 18 arranges together the DCT coefficients F(u,v) which satisfy u+v=k as one group and calculates an arithmetic mean of the DCT coefficients F(u,v) of each group so as to form an in focus information data for the group.

After that, the unit 18 discriminates a largest in focus information data of the group having the most maximum DCT coefficients out of the in focus information data of the groups. The arithmetic mean of the DCT coefficient of each group is weighted so that the frequencies of the components become almost equal together by multiplying the numerals of FIG. 4. Therefore, the largest in focus information data can be evaluated in the same reference level with respect to the DCT coefficients of the groups, whereby an in focus information data G can be obtained. In this case, assuming that the DCT coefficients are represented by Gij as illustrated in FIG. 6, the arithmetic mean Gk of the kth group is represented as $$Gk = \sum_{i,j=k}^{k} Gij$$

wherein i and j change always satisfying i+j=k.

Also, a single in focus information data G can be represented by $$G = \sum_{k=0}^{k} k \times Gk.$$

Many widely different embodiments of the present invention may be constructed without departing from the spirit and scope of the present invention. It should be understood that the present invention is not limited to the specific embodiments described in the specification, except as defined in the appended claims.

What is claimed is:

1. An auto focusing device comprising:
   an image pickup means for photographing a subject and outputting video signals of the photographed subject;
   a digitizing means for digitizing the video signals output from the image pickup means;
   an orthogonal transformation means for transforming the digitized video signals into a frequency component matrix composed of a plurality of frequency components by an orthogonal transformation of the digitized video signals; and
   an operational processing means for grouping each of the plurality of frequency components in the matrix into a plurality of frequency component groups in accordance with frequency characteristics of each frequency component, each frequency component group having frequency components similar with each other in frequency characteristic, and for outputting focusing information based on the frequency component groups,
   the image pickup means being adapted to be controlled in focusing thereof based on the focusing information of the respective frequency component groups,
   wherein the operational processing means is adapted to weight the frequency components of the respective frequency component groups such that the frequencies of the respective frequency component groups become almost equal.

2. An auto focusing device according to claim 1, wherein the operational processing means is adapted to obtain a single focusing information from the focusing informations of the plurality of the frequency groups by a regrouping of the frequency components of the respective weighted groups.

3. An auto focusing device according to claim 2, wherein the image pickup means is adapted to be adjusted in focusing thereof based on the weighted frequency components from the calculating means.

4. An auto focusing device comprising:
   an image pickup means for photographing a subject and outputting video signals of the photographed subject;
   a digitizing means for digitizing the video signals output from the image pickup means;
   an orthogonal transformation means for transforming the digitized video signals into a frequency component matrix composed of a plurality of frequency components by an orthogonal transformation of the digitized video signals; and
   an operational processing means for grouping each of the plurality of frequency components in the matrix into a plurality of frequency component groups in accordance with frequency characteristics of each frequency component, each frequency component group having frequency components similar with each other in frequency characteristic, and for outputting focusing information based on the frequency component groups,
   the image pickup means being adapted to be controlled in focusing thereof based on the focusing information of the respective frequency component groups,
   wherein the operational processing means calculates a mean coefficient for each focusing group based on the focusing information from each frequency component group.

5. An auto focusing device according to claim 4, wherein the image pickup means is adapted to be controlled in focusing based on detecting the frequency component group having the largest mean coefficient.

* * * * *